United States Patent [19]

Nicol

[11] 4,084,726
[45] Apr. 18, 1978

[54] SEED DISPENSER

[76] Inventor: William A. Nicol, 65 Newtown Ave., Stratford, Conn. 06497

[21] Appl. No.: 778,866

[22] Filed: Mar. 18, 1977

[51] Int. Cl.² .............................................. B65G 65/62
[52] U.S. Cl. ....................................... 221/266; 111/96
[58] Field of Search ............... 222/366, 286, 287, 158; 221/266; 111/92–97

[56] References Cited

U.S. PATENT DOCUMENTS

| | | | |
|---|---|---|---|
| 2,063,605 | 12/1936 | Janssens | 222/366 X |
| 2,311,330 | 2/1943 | Dudley | 222/366 |
| 2,628,003 | 2/1953 | Mauer | 221/266 X |
| 2,742,198 | 4/1956 | Belshaw et al. | 222/287 |
| 3,241,728 | 3/1966 | Murphy | 222/158 X |

Primary Examiner—Joseph F. Peters, Jr.
Assistant Examiner—Norman L. Stack
Attorney, Agent, or Firm—Arthur A. Johnson

[57] ABSTRACT

A finger-held and operated small seed dispenser has a seed container having one open end through which the container may receive the seeds to be dispensed, the open end being closed by a removable spout through which the seeds may pass; a seed dispensing rod extends through said container and the spout and beyond the enclosed end and there has a fingerpiece, said rod having a cylindrical portion that normally closes the open end of the spout against the escape of the seeds until the rod is finger operated, the rod having a longitudinal groove for the passage of the seeds and a transverse groove to facilitate the entrance of the seeds into the longitudinal groove.

4 Claims, 3 Drawing Figures

U.S. Patent   April 18, 1978   4,084,726
FIG. 1
FIG. 2
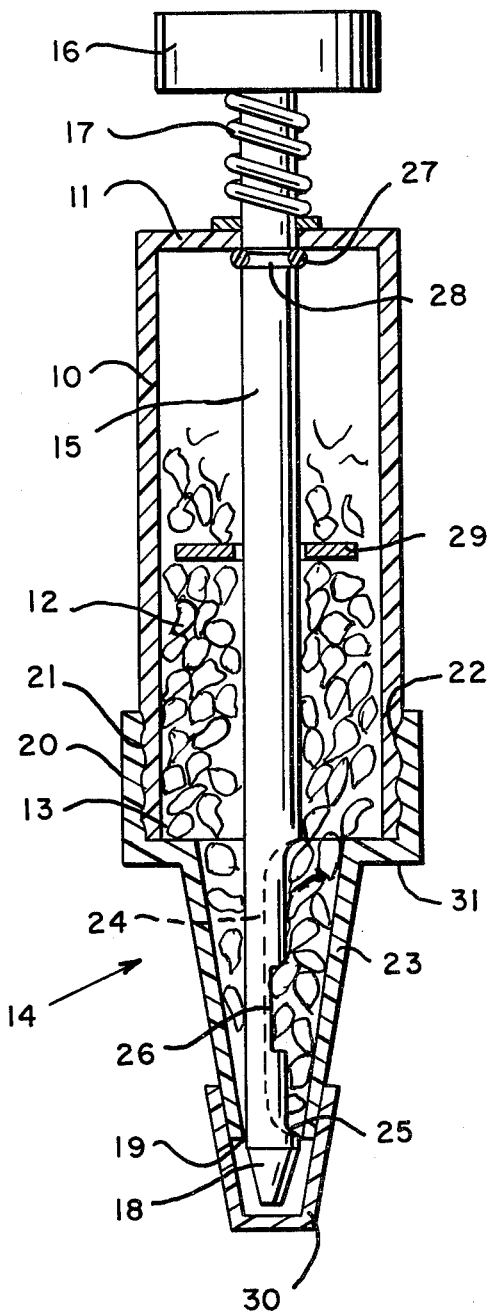
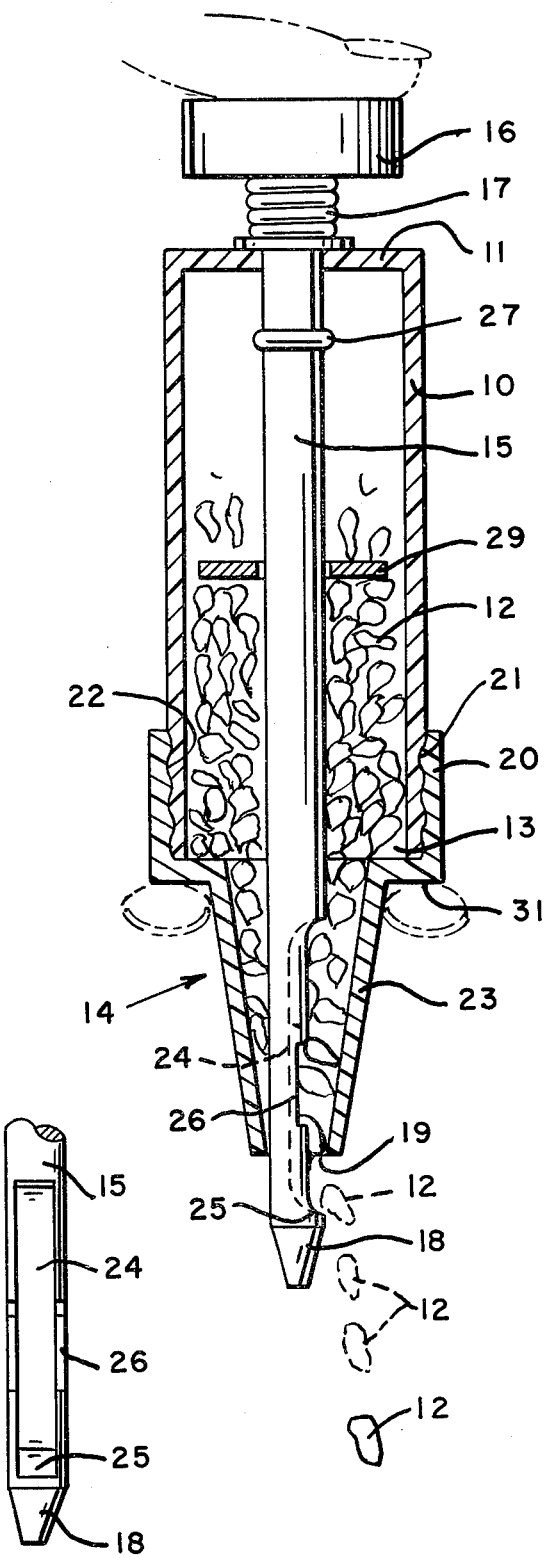
FIG. 3

SEED DISPENSER

The present invention relates to hand planting small seeds, particularly flower and vegetable seeds. In planting such seeds, it is difficult to drop one seed at a time in the prepared furrow properly spaced, with the result that when the seedlings appear it is necessary, to prevent crowding, to thin out some of the plants which is wasteful and also damaging to the roots of the plants that remain.

To avoid this problem, the present invention provides a simple seed planter which may be easily held and operated by the fingers of one hand and which, when properly adjusted to the size of the seed to be dispensed, will drop one seed into the furrow when the button on the exposed end of the dispensing rod is depressed as the dispenser is carried along the furrow and above it leaving the other hand free to form the furrow if so desired, the distance between the shoulder of the cap and the push button being such that the latter may be engaged by the thumb of a user's hand while the two adjacent fingers of the same hand are engaging the underside of the cap of the spout.

PRIOR ART

Heretofore it was proposed to provide seed planters, but these usually have been in the form of staffs or canes. Representatives of such proposals are disclosed in U.S. Pat. Nos. 11,642 — 17,258 — 399,938 — 577,795 — 880,379. Each of these patents is carried and operated by hand and is constructed to pierce the ground as an incident to the depositing of the seed. Referring particularly to U.S. Pat. No. 11,642, it is noted that the hand-held seed planter is operated by "forcing the bottom of the drill aa into the earth by means of the long handle b, which is usually worked with both hands."

Other features and advantages will hereinafter appear.

In the accompanying drawings:

FIG. 1 is a vertical section of the seed dispenser of the present invention in seed-retaining position.

FIG. 2 is a similar view but showing the seed dispenser in seed-dispensing position.

FIG. 3 is a side view of the end of the dispenser rod showing the seed-dispensing channel.

As shown in the accompanying drawing, the seed dispenser of the present invention comprises a container 10, in the form of a transparent tube, having one end 11 closed against the passage of small seeds 12. The seeds 12 are placed in the container through an open end 13 of the container and are dispersed from the container through a tapered spout 14 detachably connected to the open end 13 of the container.

Slidably mounted in said spout and in the closed end 11 of the container is a seed dispensing rod 15 which has outside the closed end 11 a button-like fingerpiece 16 by means of which the rod may be reciprocated against the tension of a return spring 17 located between the closed end 11 of the tube 10 and said button 16. The spring 17 when compressed serves as a stop to limit the movement of the rod 15 in the container.

The free end of the rod 15 has a cylindrical portion 18 that normally projects through and closes the open end 19 of the spout.

One end of the spout 14 is in the form of a cap 20 having screw threads 21 engaging cooperating screw threads 22 on the seed container 10. Integral with the cap 20 is a tapering portion 23 which externally and internally tapers to the mouth 19 of the spout and in this portion the seeds collect for dispersion when the dispenser is held vertically.

To load the container 10 with seeds, the dispenser is held vertically with the spout up. The spout 14 is then unscrewed from the tube 10 and with the thus opened end up a quantity of seeds is poured into the container. Then the spout is screwed on the tube causing the end of the rod to extend through the seeds to cause the portion 18 to close the open end of the spout and retain the seeds therein when the position of the dispenser is inverted.

In order to deliver seeds from the container to and through the mouth 19 of the spout, the rod 15 is provided with a longitudinal channel 24 which in inactive position of the rod extends from a position close to the top of the tapered portion of the spout 14 to a position shown in FIG. 1 with the end of the slot close to, but not extending through the mouth 19 of the spout.

When the container is upright, the seeds are accumulated in the channel 24 in position to escape therefrom when the rod 15 is finger operated by the button 16 to move an outwardly sloping end 25 of the channel 24 clear of the mouth of the spout, allowing the nearest seed to escape.

An important feature of this invention is the provision of a lateral opening 26 in the channel 24 which permits the lateral escape of the seeds if they tend to jam in the spout or channel 24 as they approach the mouth of the spout.

In use, after filling the container 10 with the desired species of seeds, the container is positioned substantially vertically over a prepared furrow of proper depth and the button on the seed dispenser is depressed repeatedly as the seed dispenser is moved along the furrow to space the seeds at desired distances. The upper movement of the dispensing rod 15 is limited by an O-ring 27 located in an annular groove 28 in the rod striking the closed end 11 of the contaner.

A floating disk 29 may be placed on the rod 15 to agitate the seeds should they become jammed in the container.

To accommodate the dispenser for seeds of various size within limits, the cap 20 may be adjusted on the container to permit more or less space for the passage of seeds between the mouth of the spout and the portion 18 of the rod.

As shown in FIG. 1, a protective cap 30 may be screw threaded or otherwise secured to the lower end of the spout. This will prevent inadvertent or unintentional operation of the dispensing rod.

It should be noted that the tapered spout is not intended to be inserted in the ground. It is not a planter.

As shown in dotted lines in FIG. 2, in use the dispenser may be held by placing two fingers (the first and second fingers or the second and third fingers) under the shoulder 31 of the cap 20 with the thumb of the same hand engaging and operating the button 16.

Variations and modifications may be made within the scope of the claims and portions of the improvements may be used without others.

I claim:

1. A finger-held and operated seed dispenser comprising a tubular transparent container having one end open and the other closed to receive and retain a supply of seeds to be planted; a spout having a collar removably mounted on the open end of the container to give access to the container for reception of seeds, said spout being tapered to permit the passage therethrough, one at a time, of seeds of approximately the same diameter; a seed dispensing rod positioned centrally in said container carried by and extending through the closed end of the container and having on its exposed end a finger operable button; and spring means between the button and the closed end of the container to yieldingly hold the rod in normal inactive position, the other end of said dispensing rod having a diameter approximately equal that of the outlet of the spout to prevent, in idle position of the dispensing rod, seeds from passing through and out of said outlet, said rod having a longitudinal channel positioned in said spout to receive and guide seeds moving by gravity toward the end of the spout, the end of the channel sloping outwardly to permit seeds in the channel to escape one at a time from the spout and drop into a furrow when the dispensing rod is manually moved downwardly through the spout by finger force applied to said button.

2. A seed dispenser according to claim 1 in which there are breaks in the sides of the channel to facilitate the entrance of the seeds laterally into said channel.

3. A seed dispenser according to claim 1 in which the collar of the spout is adjustably mounted on the container to vary the space between the dispersing rod and the open end of the spout to accommodate seeds of different varieties which are of different sizes.

4. A seed dispenser according to claim 1 in which the collar has a shoulder positioned close enough to the manually operable button to be engageable by the fingers of a user's hand simultaneously with the engagement by the thumb of the same hand of the user.

* * * * *